Patented Mar. 26, 1940

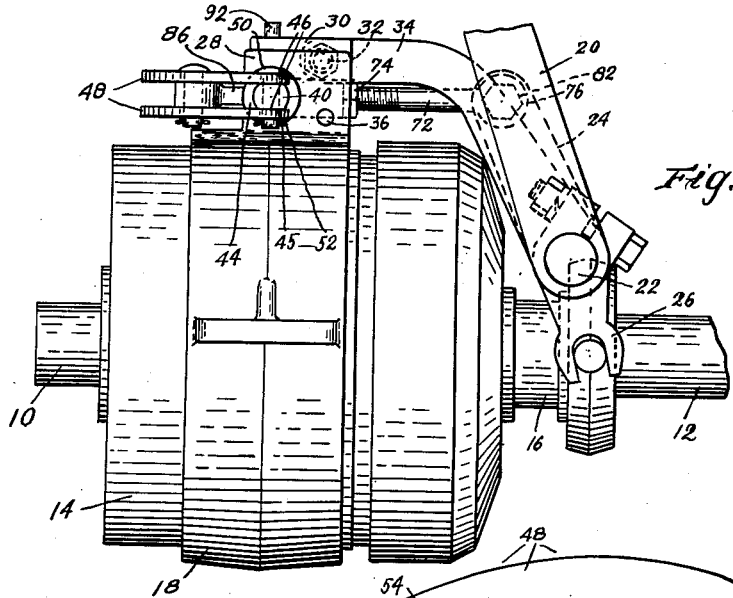

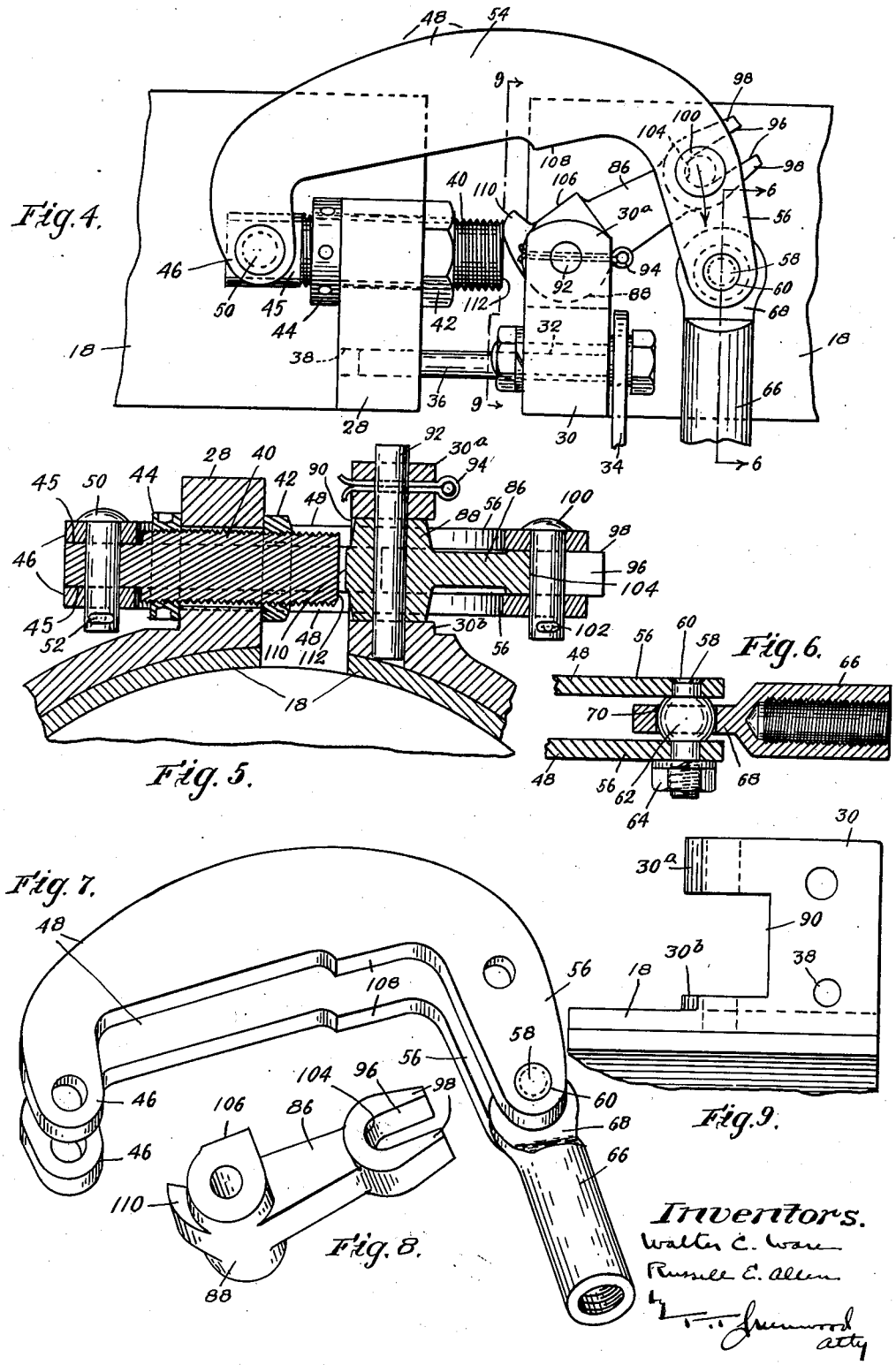

2,194,840

UNITED STATES PATENT OFFICE 2,194,840

BRAKE MECHANISM

Walter C. Ware and Russell E. Allen, Taunton, Mass., assignors to Paragon Gear Works, Inc., Taunton, Mass., a corporation of Massachusetts Application December 23, 1938, Serial No. 247,429

8 Claims. (Cl. 188—77)

This invention relates to brakes and brake operating mechanism particularly as associated with reverse gearings of the planetary type.

A reverse gearing usually has clutch mechanism to connect the driving and driven shafts for forward drive of the boat in which the gearing is installed and brake mechanism to connect the shafts for reverse drive.

The brake mechanism usually includes a rotatable gear-carrying brake drum and a contractible resilient brake band which encircles the drum and is adapted to hold the drum stationary to set the gearing for reverse drive.

The brake and clutch mechanisms are operated by a common operating member and the clutch and brake operating mechanisms associated with the common operating member are so arranged that each can move idly while the other mechanism is being set.

The band operating mechanism, heretofore, frequently has included an axially movable cam rod acting on the band ends to force them toward each other to set the brake. This mechanism for many types of brake mechanisms is quite satisfactory but for some types, and particularly for a brake band having a fabricated friction lining, requires the application of more pressure than is desired on the operating lever and also exerts considerable force on the band in a direction tending to displace the band axially of the gearing.

Hence an object of the present invention is the provision of an improved form of brake operating mechanism capable of exerting a relatively great pressure against the ends of the brake band to draw it about its cooperating brake drum, for a moderate amount of force applied to the operating member or lever and for a moderate axial force on the band.

A further object of the invention is the provision of brake operating mechanism that is capable of being automatically locked in brake set position and a mechanism that will snap into and out of set position.

Another object of the invention is the provision of brake operating mechanism so arranged that it is caused to exert a pressure between the ends of the brake band in a direction positively to expand the band and release it from holding engagement with the cooperating brake drum.

Another object of the invention is the provision of a brake operating mechanism wherein the adjustment of the various parts thereof is capable of being made easily and wherein the adjustment does not change unintentionally during the operation of the mechanism.

Another object of the invention is the provision of brake operating mechanism comprising an under-shot or inverted toggle, the links of which are pivotally connected to the two ends of the brake band, one of the links being relatively long and having a pivotal connection with the band remote from the end thereof so that the tendency for sidewise thrust on the band end during the toggle setting operation is minimized.

A yet further object of the invention is the provision of brake operating mechanism comprising toggle links having inter-engaging surfaces constituting a stop which defines the closed position of the toggle.

A further object of the invention is generally to improve the construction and operation of brakes and operating mechanisms therefor.

Fig. 1 is a side elevation of a reverse gearing embodying the present invention.

Fig. 2 is a plan view of the brake band and the band operating mechanism of Fig. 1, the mechanism being illustrated in brake free position.

Fig. 3 is a plan view of the mechanism of Fig. 2 in the brake set condition thereof.

Fig. 4 is a plan view of the mechanism of Fig. 2 in an intermediate position where the toggle begins to be effective in drawing together the ends of the brake band.

Fig. 5 is a section of the set mechanism taken along line 5—5 of Fig. 3.

Fig. 6 is a sectional detail of the universal joint between the operating link and the toggle link, taken along line 6—6 of Fig. 4.

Fig. 7 is a perspective view of the long toggle link.

Fig. 8 is a perspective view of the short toggle link.

Fig. 9 is an elevation of the right hand end of the brake band of Fig. 4 with the mechanism removed, taken along line 9—9 of Fig. 4.

The present invention is embodied in a reverse gearing having a driving shaft 10, a driven shaft 12, a rotatable drum or casing 14 carrying planetary gear elements that, when the casing is held stationary, serves to connect the driving and driven shafts for the relatively reversed rotation of the driven shaft.

The casing also contains clutch mechanism operated by an axially slidable sleeve 16 on the driven shaft which when set serves to connect the driving and driven shafts for conjoint rotation in the same direction.

The casing 14 is encircled by a resilient brake band 18 which is adapted to be contracted forcibly around and in frictional engagement with the drum to hold it stationary to secure reverse drive of the driven shaft.

The clutch and brake mechanisms are operated by means of a common operating member or handle 20 fixed to a cross shaft 22 having an upstanding arm 24 which connects with the brake operating mechanism presently to be described. The shaft 22 also has fixed thereto a yoke 26 which effects the axial movement of the clutch operating sleeve 16 in opposite directions to set and release the clutch. Movement of the operating lever 20 in a reverse direction, as toward the right Fig. 1, effects the contraction of the brake band 18 and the reverse drive of the driven shaft. Movement of the operating lever in the opposite or forward direction effects first the disengagement of the brake drum and second the movement of the clutch operating sleeve to set the clutch. In the intermediate position of the operating lever both the clutch and the brake mechanisms are disengaged and the driven shaft 12 is free from positive driving connection with the driving shaft.

The brake band 18 is integrally provided with upstanding lugs or ears 28 and 30, respectively, disposed at the confronting spaced end parts of the band, said lugs occupying approximately half only of the total width of the brake band. The lug 30 has a bolt 32 passed therethrough and fixed therein on which the forward end of a link 34 is freely pivoted. The link extends rearwardly to the cross shaft 22 on which it is pivoted and forms a strut member holding the band against undue axial movement on the brake drum during the setting operation of the band. The band end 30 has a pin 36 fixed therein which extends forwardly and loosely into a hole 38 in the confronting band end 28 and forms a guide which permits the band ends to move toward and away from each other freely while holding them from relative lateral displacement.

The ear 28 has a hole therethrough in which a screw-threaded pivot stud 40 is loosely positioned, the stud being disposed in or near the middle plane of the brake band and crosswise of the line of the shafts and clamped in any longitudinally adjusted position in the ear by a nut 42 and a spanner ring 44 screw-threaded on the stud and bearing against opposite faces of the ear 28.

That end of the stud 40 projecting beyond the lug 28 away from the lug 30 is provided with opposed flattened faces 45 forming horizontal seats for the pivoted ends 46 of a pair of identical long toggle links 48. Said links are pivoted on a headed pin 50 passed through the ends of the links and loosely through the flattened end of the stud 40, the pin being held removably in place by a cotter pin 52 passed through the pin under the lowermost link.

The body portions 54 of the links are extended forwardly toward the other band end and approximately at right angles with the pivoted end 46 so as to clear the end of the lug 28 in the set position of the links. The forward ends 56 of the links are at right angles with the body portions thereof and are generally parallel with the pivoted ends 46 and have aligned openings therethrough in which a stud 58 is fixed.

Said stud 58 is provided with an enlarged head 60, see Fig. 6, which lies in a counter-sunk portion in the passage through the upper link and has an enlarged spherical body 62 disposed between the links. The screw-threaded end part of the stud passes through the lower link and a nut 64 threaded thereon serves to clamp the links together on opposite sides of the spherical body portion 62.

Said spherical body portion forms a universal connection with an internally screw-threaded sleeve 66 which has a lug 68 at one end provided with a cylindrical passage 70 therethrough in which the body portion 62 is located by the provision of the spherical body portion. The angular position of the sleeve 66 with respect to the links can be changed without cramping the sleeve in the links.

An operating rod 72 is adjustably screw-threaded in the sleeve 66 and is fixed in axially adjusted position therein by the check nut 74. The free end of the rod 72 is provided with an ear 76 having a cylindrical passage 78 therethrough in which the spherical body 80 of a hexagonally headed sleeve 82 is located, the sleeve being internally screw-threaded and clamped to the operating arm 24 by a bolt 84 that is screw-threaded into the sleeve. This construction also permits changes of angularity between the rod 72 and the arm 24 without interfering with the free action of the parts or imposing undue resistance to their relative movement.

The long toggle links 48 cooperate with a short toggle link 86. Said link 86 is provided at one end with an upstanding hub 88, see especially Figs. 5 and 8, which is located in a recess 90 of the lug 30 and is pivoted on a pivot pin 92 that passes loosely through the hub and through or into the parts 30a and 30b of the lug 30 lying respectively above and below the hub. The pin 92 is secured removably in the lug 30 by a cotter pin 94 which passes removably through aligned holes in the part 30a of the lug and in the pin. The pin upstands above the top of the lug so that it can be grasped and withdrawn after the removal of the cotter pin.

The other end of the short link 86 is bifurcated or has a slot 96 extended inwardly from the free end thereof and arms 98 on opposite sides of the slot. The bifurcated end of the short link is located loosely between the end parts 56 of the long toggle link 48. A toggle joint pin 100, similar to the pin 50, passes loosely through the end parts 56 of the long toggle link and is retained removably therein by a cotter pin 102. The pin is also located in the slot 96 of the short toggle link.

The disposition of the parts is such that when the operating lever 20 is in the extreme forward or clutch-set position the parts of the toggle are in the position illustrated in Fig. 2 where the brake band ends are separated their extreme amount and the toggle pin 100 is in an upper portion of the slot 96 in the short toggle link and hence is free from pressure applying engagement with the short link. When, however, the operating lever 20 is pulled rearwardly or toward the right, Fig. 1, the long toggle link is swung to reduce the angularity between the two links so that the toggle pin 100 approaches the bottom 104 of the slot of the short toggle link. This free movement of the toggle links is accomplished without imposing any brake setting pressure on the ends of the brake band and permits movement of the operating lever 20 sufficiently to cause the clutch to be disengaged and the reverse gearing set in neutral position.

Further movement of the operating lever 20 in a rearward direction or toward the right, Fig. 1, brings the toggle pin 100 against the bottom 104 of the slot in the short toggle link, as is illustrated in Fig. 4.

Continued movement of the operating member in the same direction straightens the toggle and thus causes the pin to exert pressure on the short toggle link so that the brake band ends are forced toward each other and the band is contracted about the brake drum. The maximum pressure is exerted on the brake band when the pins 50, 92 and 100 are in line.

The toggle is caused to be moved into a slightly over center position, as illustrated in Fig. 3, wherein the toggle is locked automatically in such position where it holds the brake band contracted about the drum until the operating lever 20 is moved in a forward direction.

The long and short toggles have inter-engaging parts which define the set position of the toggle as illustrated in Fig. 3. For this purpose the hub 88 of the short toggle is provided with a vertical flat face 106 which is carried by and is approximately coextensive with the length of the hub and confronts flat faced ledges 108 of the two sections of the long toggle link. The parts 106 and 108 are adapted to engage in the manner illustrated in Fig. 3 in the set position of the toggle to prevent movement of the links beyond a predetermined over-center position of the toggle.

When the toggle is opened by movement of the operating lever in a forward direction the resiliency of the brake band causes the positive movement of the toggle parts into an open and brake release position as soon as the toggle is moved across the center.

The hub 88 of the short toggle link is provided with a cam projection 110 which cooperates with the flat inner end face 112 of the bolt 40 in movement of the toggle in an un-setting or brake release direction to expand the brake band positively or force the ends thereof apart if for some reason the resiliency of the band is not by itself sufficient to disengage the band from holding engagement with the brake drum.

We claim:

1. Brake mechanism including a contractible band having confronting ends, a pivot stud carried by one band end having one end near and its other end remote from said other band end, a long toggle link pivoted to the remote end of said stud and overlying in part said other band end, a short toggle link pivoted to said other band end and extended generally parallel with said long link and having a pivotal connection therewith at its free end, and means for swinging said links about their pivotal connections.

2. Brake mechanism including a contractible brake band having confronting free ends and confronting upstanding lugs on said free ends, a pivot stud passed loosely through one lug and having a longitudinally adjustable connection therewith, a long relatively straight toggle link having legs at its ends both projected in the same direction, one leg being pivoted to said stud on the side of said lug remote from said other lug and the link being extended at least in part over said other band end, a short toggle link pivoted to said other lug and extended generally parallel with said long link and having a pivotal connection with said other leg, and means for swinging said links about their pivots connected with said other leg.

3. Brake mechanism including a contractible brake band having confronting free ends and upstanding confronting lugs on said free ends, an externally screw-threaded pivot stud passed loosely through one lug, jamb nuts screw-threaded on said stud and engaging the opposite faces of the associated lug for holding said stud in longitudinally adjusted position, a long toggle link having a pivotal connection with said stud on the side of the associated lug opposite the other lug and extended over the other band end, a short toggle link pivoted to said other lug and extended generally parallel with said long link and having a lost motion pivotal connection therewith, and means for operating said toggle.

4. Brake mechanism including a contractible brake band having confronting ends provided with confronting lugs, a pivot stud carried by and having a longitudinally adjustable connection with one of said lugs, a long toggle link having a pivotal connection with said stud on the side of the associated lug opposite said other lug and extended over said other band end, said other lug being bifurcated, a short toggle link located between the furcations of said other lug and having a pivotal connection with both furcations and also having a pivotal connection with said long link, and means for swinging said links about their respective pivots.

5. Brake mechanism including a contractible brake band having confronting ends provided with upstanding lugs, a pivot stud carried by one of said lugs, a pair of spaced long relatively straight toggle links having sets of legs at their ends all projected in the same direction, said links being disposed on opposite sides of said stud and having one set of legs pivoted thereto on the side of the associated lug remote from said other lug and extended over the other brake band end, an operating member disposed between the free ends of said links and having a pivotal connection with the legs of the other set, a short toggle link pivoted to said other lug and extended generally parallel with said long links and having a free end disposed between said long links and provided with a lost motion pivotal connection with the legs of said other set of legs.

6. Brake mechanism including a contractible brake band having confronting ends, an inverted toggle connected to the ends of said brake band for contracting it, said toggle comprising a long toggle link pivoted to one brake band end and a short toggle link pivoted to the other brake band end, said toggle links having cooperating abutting faces which define the set position of the toggle.

7. Brake mechanism comprising a contractible brake band having confronting ends provided with upstanding confronting lugs, an inverted toggle for contracting said band comprising a long toggle link having a pivotal connection with one lug and extended over the other band end, said other lug being bifurcated, a short toggle link having a hub located within the furcations of said bifurcated lug and having a pivotal connection therewith, said short link also having a lost motion pivotal connection with said long link, said hub and said long toggle link having cooperating abutting faces which define the set position of the toggle.

8. Brake mechanism including a contractible brake band having confronting ends, means engageable with one end of said band for anchoring the band against movement in an axial direction, a member rigid with one band end and having a slidable engagement with the other band end for preventing axial displacement of the band ends, and toggle mechanism interconnecting said band ends for contracting said band exerting an axial force on said band.

WALTER C. WARE.
RUSSELL E. ALLEN.